United States Patent Office

3,291,597
Patented Dec. 13, 1966

3,291,597
PROCESS FOR RECOVERING METAL VALUES UTILIZING FUSED SALTS
Svante Mellgren, Metuchen, and Lamar D. Coffin, Edison, N.J., assignors to American Metal Climax, Inc., New York, N.Y., a corporation of New York
No Drawing. Filed July 6, 1964, Ser. No. 380,632
17 Claims. (Cl. 75—63)

The present invention is directed to a process for the recovery of silver, lead, cadmium and molybdenum from various sources.

There are a wide variety of source materials containing values of silver, lead, cadmium or molybdenum. These include such primary sources as ores and concentrates, and such secondary sources as smelting and refining residues, baghouse dust and fume products, scrap from jewelers' shops, burned film containing silver halides, etc. Many of these materials are difficult to process economically using known recovery methods. A widely applicable and economical process useful for the recovery of these metals from such diverse sources is needed by industry.

It is an object of this invention to provide a process for recovering silver, lead, cadmium or molybdenum. It is a further object of this invention to recover silver from the chlorinated residues of electrolytic slimes from copper refineries. It is still a further object of this invention to recover silver from jewelers' "sweeps." This invention also contemplates recovering lead from flue dusts and baghouse products. It is still a further object of this invention to recover lead from lead sulfide and lead sulfate or mixtures thereof. It is still another object of this invention to recover cadmium from cadmium sulfide-containing materials. It is also an object of this invention to recover molybdenum from molybdenum sulfide.

Our invention contemplates adding aluminum to a fused halide salt bath containing at least one of the metals, silver, lead, cadmium and molybdenum, in an amount sufficient to reduce said metal(s) to the metallic state. A source material containing at least one of the metals, silver, lead, cadmium and molybdenum is added to the fused halide bath in finely subdivided form. The source materials include primary metal sources such as ores and concentrates, e.g., lead ores, cadmium ores, molybdenum ores, silver-containing ores, etc., and secondary metal sources such as lead and/or cadmium-containing baghouse dust, scrap such as jewelers' sweeps which are discarded material gathered from commercial jewelers' shops and often also contain burned film from studios, and copper refining slimes. These materials contain native metal, particularly silver, and/or the metal combined in one or more of a variety of forms, e.g., the sulfides, sulfates, oxides, halides, etc. The metals lead, cadmium and molybdenum are commonly obtained from their oxides and/or their sulfides. The variety of source materials treated by the present process is apparent from the more detailed discussion hereinafter and the examples.

In a preferred embodiment of the invention for treating silver-containing materials which do not contain large amounts of lead, lead is first added to the molten salt in an amount sufficient to reduce all the silver to the metallic state. Preferably sufficient excess lead is added to the bath so that molten lead is provided in the bath. The metallic silver goes into solution in the lead. Aluminum is then added to the bath in an amount sufficient to reduce the lead in the bath to the metallic state. If additional aluminum is added to the bath, a molten aluminum pool will be formed on top of the lead pool at the bottom of the bath. The silver is found to report predominantly to the aluminum phase rather than to the lead phase.

In another variant of the invention, silver and lead may be recovered from lead sulfide ores and concentrates which commonly contain silver in significant amounts and often also contain gold and platinum group metals. The lead sulfide ore in finely subdivided form is dispersed in the molten halide bath. Sufficient aluminum is then added. After the reaction is completed and the bath allowed to become quiescent, a pool of molten lead containing the silver will be found at the bottom of the bath. If excess aluminum has been used, a pool of molten aluminum will be found between the molten lead and the molten salt bath. The silver, gold and platinum group metals originally in the lead sulfide material reports to the aluminum pool or phase, if present. The process is applicable to the recovery of lead whether or not silver or other precious metals are also present.

The process of the invention is particularly adapted to recover silver from residues obtained from the chlorination of electrolytic copper refinery slimes. Such slimes usually contain gold, silver, platinum group metals, copper, nickel, iron, tin, antimony, selenium, tellurium, arsenic, lead, etc. The selenium, tellurium, arsenic, antimony and tin may be removed during the chlorination process as described in copending application Ser. No. 365,164, filed May 5, 1964. The remaining metallic elements comprising the non-volatile constituents are present largely as chlorides and/or the elemental state. When such chlorinated slimes are treated with a large excess of aluminum as in Example 1 herein, a sufficiently fluid aluminum pool containing the silver and other precious metals is formed. The aluminum also contains much of the copper, nickel and iron originally in the chlorinated slimes. When an amount of aluminum is used sufficient only to precipitate the metal chlorides as metal, or up to 100% or 200% in excess of this amount, the resultant metal pool is extremely viscous making it difficult to process as it relates to subsequent treatment of the material. To avoid the foregoing difficulty, the chlorinated slimes are preferably pretreated by leaching with dilute acid to eliminate all or much of the copper, nickel and iron, as illustrated in Example 3. Preferably, dilute sulfuric acid solution containing from about 20 to 30 g./l. of sulfuric acid is used in the leaching step. More highly concentrated solutions may be used but are less economical. After the leaching treatment, the leached material is added to the salt bath and treated with aluminum to recover the desired metals.

The process is also useful for recovering lead and cadmium from "cadmium flue dust." This material usually contains about 15% to 40% by weight of lead, from 8% to 35% cadmium; the remainder being sulfur, oxygen and minor amounts of silver and precious metals. There is usually insufficient sulfur to account for all the lead and cadmium in the form of their respective sulfides. It is believed that the lead and cadmium are present in the form of sulfides and oxides. The treatment of such material by the addition of aluminum results in the simultaneous recovery of the lead and the cadmium. Similarly, cadmium may be recovered from a wide variety of cadmium-sulfide containing source materials. Baghouse dust which contains principally lead oxide may also be used as the source material in the present process, for the recovery of lead. Lead and precious metals may also be recovered from a lead sulfate containing source material obtained as a product from a separatory process.

The process has also been found useful for the recovery of molybdenum from molybdenum disulfide concentrates.

The molten halide baths in which the process is carried out are of the alkali metal halides and/or the alkaline earth metal halides with the chlorides being preferred. These are sodium chloride, potassium chloride, lithium chloride, rubidium chloride, cesium chloride, magnesium chloride, calcium chloride, strontium chloride and barium chloride. Generally those baths having lower melting points are preferred. The low melting mixtures of potassium chloride and sodium chloride and especially the eutectic mixture thereof are preferred because of their excellent bath characteristics and relatively low cost. For best results, the specific gravity of the molten salt or mixtures thereof should be less than that of molten aluminum at the same temperature so that the molten bath phase will form the uppermost layer.

The processes of this invention may be carried out at all temperatures at which the bath is molten. It is generally desirable, however, that the temperature be maintained below 1050° C. to prevent vapor losses especially when low melting salts, e.g. the eutectic mixture of sodium chloride and potassium chloride with a melting point of about 650–675° C., are used. More importantly, at excessive temperatures there may be loss of the more valuable constituents. Consequently, it is advantageous that the recovery processes be carried out at temperatures generally between 700° C. and 1050° C. with about 750° C. being a preferred temperature.

The molten halide baths maintain in solution and/or in suspension relatively high concentrations of silver, lead, cadmium or molybdenum source materials charged thereto as the feed. As the content of source material and/or aluminum constituent is raised to very high concentrations, however, the viscosity of the fused salt bath becomes increased. The maximum practical concentration in a given bath is just below that at which the viscosity is increased to the point where effective agitation cannot be satisfactorily maintained. The maximum concentration of components in the molten salt bath will vary dependent upon the halide salt(s) and reactants utilized. The reactions described herein which are basic to the operation of the process, require effective contact between the materials and the aluminum. Agitation of the melt is accordingly essential and this may be effected by any desired means such as mechanical stirring. The reaction time during which agitation is maintained to obtain good recoveries will vary with the size of the bath, the amount and type of materials in the bath, the temperature being used, etc.

The reaction chamber may be constructed using refractory materials, e.g. quartz and other acid refractories, or from basic refractories. The chamber may be open for use with many source materials, however, materials easily oxidized, e.g. galena or flue dust, may require use of an inert atmosphere, or a fairly tight closed reaction vessel. The reaction chamber is suitably provided with taps in the lower region thereof for enabling withdrawal of molten lead and molten aluminum therefrom apart from the lighter fused salt(s) thereabove.

The invention which is further illustrated in the following examples should not be construed as limited to the details described therein. The parts and percentages are by weight except where specifically indicated otherwise.

*Example 1*

Two runs were made in which silver was recovered from chlorinated slime residues which contained 17.2% lead, 19.5% silver, 0.36% selenium, 0.18% tellurium, 0.4% arsenic, 1.3% tin, 0.35% antimony, 15% silica, 5% alumina, and a total of from 7 to 15% copper, nickel and iron. The charge to the furnace was 1050 grams of aluminum, 1150 grams of the potassium chloride-sodium chloride eutectic mixture (1.3 parts by weight KCl to 1 part NaCl) and 500 grams of the chlorinated slimes. The bath was heated to between 750 and 775° C. in a resistance heating furnace (externally wound) having a quartz crucible 7½ inches deep and 5¼ inches in diameter) for the designated time periods during which the mixture was stirred by mechanical agitation. The following results were obtained:

| Run No. | Reaction Time, hours | Percent Recovery of Ag in the Al | Percent Recovery of Pb in the Al |
| --- | --- | --- | --- |
| A | 2 | 99 | 99 |
| B | 1 | 96 | |

These tests indicated that the one hour treatment was too short for substantially complete recoveries of silver.

*Example 2*

Aluminum is used to recover the silver and lead from a fused molten salt bath. The salt was the eutectic mixture of potassium chloride and sodium chloride containing 0.9% silver and 4% lead, largely in the form of their chlorides. The charge for this run was 1010 grams of aluminum, 680 grams of the foregoing salt, and 1115 grams of fresh potassium chloride-sodium chloride eutectic. The bath was heated to 775° C. in the equipment described in Example 1, for four hours with mechanical agitation. The recovery was 100% of the silver. The recovery of liquid lead was 95% of the total lead contained in the system.

*Example 3*

The pretreatment of chlorinated slimes to leach copper, nickel and iron is illustrated. Chlorinated slimes (750 grams) containing 20.0% silver, 15% lead, 5.5% copper, 5.3% nickel, 1.0% iron, 23.5% chlorine, and the remainder largely alumina and silica were leached in 3 liters of a hot 25 g./l. $H_2SO_4$ solution. The leaching removed 82% of the copper, 90% of the nickel and substantially all of the iron. The leached slimes amounting to 556 grams were charged with 1725 grams of sodium chloride and 89 grams of aluminum and the bath held for 4 hours at 900° C. with agitation. The resultant metal button contained 16.5% aluminum, 43.6% silver, 33.1% lead, and the residual copper and nickel.

The silver recovery was 98.9% and the lead recovery 99.6%. The residual copper and nickel in the metal button is sufficiently low so that these metals can be readily eliminated in the Dore furnace. In the case of the unleached material, the content of copper, nickel and iron is such that these metals cannot be satisfactorily removed without incurring excessive silver losses. Similar leaching of chlorinated slimes under somewhat different conditions resulted in elimination of up to 100% of the copper, nickel and iron.

*Example 4*

To illustrate the use of a combination of aluminum and lead metal, a charge of 925 grams of aluminum, 2000 grams of lead, 1725 grams of the potassium chloride-sodium chloride eutectic and 500 grams of the chlorinated slime residues described in Example 1 were melted and agitated for two hours after which the material was then poured into a graphite crucible and held overnight at 750° C. The salt bath leach residue contained a trace of silver and 0.8% lead indicating recoveries of close to 100% for silver and 99% for lead. The aluminum metal contained 99% of the silver, while the lead metal contained 1% of the silver.

*Example 5*

The applicability of the process for the recovery of silver from raw electrolytic refinery slimes is illustrated. The charge contained 1064 grams of aluminum metal, 1150 grams of the potassium chloride-sodium chloride eutectic, and 500 grams of raw slimes which contained silver, lead, selenium, tellurium and antimony values. The furnace was maintained at 750° C. for two and one-half hours with mechanical agitation. The odor of selenium was noticed during the charging, which was not experienced in a similar run with lead as the replacing metal. The bath was not refractory. Substantially all (92%) of the silver and about half of the lead were recovered in the aluminum. The aluminum did not contain any selenium or tellurium.

*Example 6*

Galena (86.2% Pb) concentrate (75 grams) was crushed to 30 mesh and charged to a molten potassium chloride-sodium chloride eutectic (1150 grams) covering aluminum metal (1067 grams). The bath was agitated for four hours at 750° C. A nitrogen atmosphere was maintained to prevent burning of PbS and of generated $Al_2S_3$. A fairly tight reaction vessel would make the use of the inert atmosphere unnecessary. After cooling, the salt and the metal ingot were separated. The lead recovery was 99.0–99.9%.

*Example 7*

Cadmium flue dust (500 grams) containing 29.9% cadmium, 29% lead, 8–10% sulfur, and being largely a mixture of PbO, PbS, CdO and CdS, was charged with 1016 grams of aluminum and 1725 grams of the potassium chloride-sodium chloride eutectic. The bath was agitated for four hours while the temperature was maintained at 840° C. under a nitrogen atmosphere. After the bath was cooled, a metal ingot at the bottom contained cadmium, lead and aluminum.

*Example 8*

Following the procedure of Example 1, molybdenum which was introduced into the bath as $MoS_2$ concentrate was precipitated from the fused bath. The initial bath temperature of 750° C. was raised to 890° C. during the reaction by heat evolved during the reaction.

*Example 9*

Following the procedure of Example 1, lead which was introduced as $PbSO_4$ was recovered. The bath temperature was about 850° C.

Although the examples utilize the sodium chloride bath, or the low melting point potassium chloride-sodium chloride eutectic, similar results are obtained when using baths consisting of one or more of the other fused halide salts hereinbefore mentioned.

An efficient recovery process for the recovery of silver involves a two-stage addition of lead metal, followed by addition of aluminum. In a first vessel, silver-containing fused salt is treated with lead metal. The treated salt is removed to a second vessel where it is scavenged for silver with a further addition of new (non-silver-containing) lead metal. The lead metal resulting from this second stage treatment is combined with the silver-containing lead metal used for the first stage treatment of the relatively high silver-containing material. The scavenged bath from the second stage operation is then treated with aluminum metal, precipitating the lead and silver from the bath.

The process of this invention is economical. Secondary aluminum may be used. Theoretically, one pound of aluminum results in the reduction of 11.5 pounds of lead. Such recoveries should be substantially obtained in large scale installations.

Obviously, many modifications and variations of the invention are possible in the light of the above teachings. It is therefore to be understood that, within the scope of the appended claims, the invention may be practiced otherwise than as specifically described.

What is claimed is:

1. The process for recovering at least one metal selected from the group consisting of silver, lead, cadmium and molybdenum, from a fused salt bath consisting essentially of at least one salt selected from the group consisting of alkali metal halides and alkaline earth metal halides, and containing at least one metal selected from the group consisting of silver, lead, cadmium, molybdenum, comprising adding to said bath an amount of aluminum in excess of that required to reduce said metal to the metallic state thereby forming a molten aluminum pool and thereafter recovering said metal from said bath.

2. The process of claim 1 wherein said halides are chlorides, said fused salt bath having a specific gravity less than that of molten aluminum at the same temperature.

3. The process of claim 2 wherein said molten salt bath is a mixture of potassium chloride and sodium chloride.

4. The process of claim 2 wherein the temperature of the molten bath is between 700° C. and 1050° C.

5. The process for recovering lead from a fused salt bath consisting essentially of at least one salt selected from the group consisting of alkali metal chlorides and alkaline earth metal chlorides, and containing lead, said fused salt bath having a specific gravity less than that of molten aluminum at the same temperature, comprising adding to said bath an amount of aluminum in excess of that required to reduce the lead to the metallic state thereby forming molten lead and aluminum pools and thereafter separating said molten lead from said bath.

6. The process of claim 5 wherein the lead in the bath is initially added in the form of lead sulfide.

7. The process of claim 5 wherein the lead in the bath is initially added in the form of lead chloride.

8. The process of claim 5 wherein the lead in the bath is initially added in the form of lead oxide.

9. The process for recovering silver from a fused salt bath consisting essentially of at least one salt selected from the group consisting of alkali metal chlorides and alkaline earth metal chlorides and containing silver, said fused salt bath having a specific gravity less than that of molten aluminum at the same temperature, comprising adding to said bath an amount of aluminum in excess of that required to reduce the silver and any lead that may be present in said bath to the metallic state thereby forming a molten aluminum pool underlying said bath, and recovering said silver.

10. The process for recovering silver from chlorinated slimes comprising preparing a molten bath consisting essentially of at least one salt selected from the group consisting of alkali metal chlorides and alkaline earth metal chlorides and containing said slimes, said molten bath having a specific gravity less than that of molten aluminum at the same temperature, and adding to said bath an amount of aluminum in excess of that required to reduce the silver and any lead that may be present in said bath to the metallic state thereby forming a molten aluminum pool underlying said bath, and recovering said silver.

11. The process of claim 10 wherein said chlorinated slimes are pretreated prior to addition thereof to the said molten bath by leaching with dilute sulfuric acid solution to remove a predominant portion of the copper, nickel and iron contained therein.

12. The process for recovering silver from a fused salt bath lighter than molten aluminum at the same temperature consisting essentially of at least one salt selected from the group consisting of alkali metal chlorides and alkaline earth metal chlorides and containing silver, comprising
  (1) adding sufficient lead to said bath to reduce the silver to the metallic state, and
  (2) adding an amount of aluminum to said bath in excess of that required to reduce the lead to the metallic state thereby forming a molten aluminum pool underlying said bath, and
  (3) thereafter recovering said silver.

13. The process of claim 12 wherein the lead and aluminum are added at the same time.

14. The process of claim 12 wherein the lead is added, and then the aluminum is added.

15. The process for recovering silver from a molten salt bath consisting essentially of at least one salt selected from the group consisting of alkali metal chlorides and alkaline earth metal chlorides having a specific gravity less than that of molten aluminum at the same temperature and containing silver, comprising
  (1) adding lead to said bath in an amount sufficient to form molten lead in the bath,
  (2) separating the molten lead and treating the molten salt bath with a fresh supply of lead metal in an amount sufficient to reduce the remaining silver in the bath to the metallic state
  (3) reintroducing the molten lead previously separated into the molten salt bath,
  (4) adding an amount of aluminum in excess of that required to reduce the combined lead in said bath to the metallic state thereby forming a molten aluminum pool underlying said bath, and
  (5) recovering said silver from said salt bath.

16. The process for recovering cadmium from a fused salt bath consisting essentially of at least one salt selected from the group consisting of alkali metal chlorides and alkaline earth metal chlorides and containing cadmium, said fused salt bath having a specific gravity less than that of molten aluminum at the same temperature, comprising adding to said bath aluminum in an amount in excess of that required to reduce the cadmium present in said bath to the metallic state thereby providing a molten aluminum pool underlying said salt bath, and recovering the cadmium from said bath.

17. The process for recovering molybdenum from a fused salt bath lighter than molten aluminum at the same temperature, said bath consisting essentially of at least one salt selected from the group consisting of alkali metal chlorides and alkaline earth metal chlorides and containing molybdenum sulfide, comprising adding to said bath an amount of aluminum in excess of that required to reduce the molybdenum present in said bath to the metallic state thereby providing a molten aluminum pool underlying said salt bath, and thereafter recovering the molybdenum from said bath.

References Cited by the Examiner
UNITED STATES PATENTS

| | | | |
|---|---|---|---|
| 1,011,898 | 12/1911 | Ashcroft | 75—83 X |
| 1,078,360 | 11/1913 | Langguth | 75—89 X |
| 1,648,954 | 11/1927 | Marden | 75—84.5 X |
| 2,296,196 | 9/1942 | Behr et al. | 75—63 |
| 2,396,792 | 3/1946 | Kroll | 75—63 X |
| 2,396,793 | 3/1946 | Kroll | 75—63 X |
| 2,452,665 | 11/1948 | Kroll et al. | 75—63 |
| 2,844,459 | 7/1958 | Wyatt | 75—71 |
| 2,847,299 | 8/1958 | Keller et al. | 75—84.4 X |

DAVID L. RECK, *Primary Examiner.*

H. W. TARRING, *Examiner.*